United States Patent [19]

Mazurek

[11] Patent Number: 5,017,328
[45] Date of Patent: May 21, 1991

[54] VIBRATION DAMPENING MOTOR MOUNT

[76] Inventor: John D. Mazurek, 303 Cedar Rd., Vista, Calif. 92083

[21] Appl. No.: 348,520

[22] Filed: May 4, 1989

[51] Int. Cl.$^5$ .............................................. F16F 1/36
[52] U.S. Cl. .................................. 267/136; 248/560; 267/141; 267/153
[58] Field of Search ............... 267/136, 257, 258, 141, 267/153, 292, 293, 294, 141.3, 141.4, 141.5, 141.7; 403/225, 227, 228; 248/560, 562, 605, 606, 614, 615, 636, 638

[56]  References Cited

U.S. PATENT DOCUMENTS

| 2,719,017 | 9/1955 | Mordarski et al. | 267/153 |
| 2,893,665 | 7/1959 | Paulsen | 248/615 |
| 3,244,386 | 4/1966 | Bourgeois | 267/141.3 |
| 4,836,512 | 6/1989 | Lun | 248/562 |

FOREIGN PATENT DOCUMENTS

| 237444 | 10/1960 | Australia | 267/141.5 |
| 695430 | 10/1964 | Canada | 248/615 |
| 432732 | 3/1948 | Italy | 267/141.3 |
| 0081533 | 5/1985 | Japan | 248/560 |
| 1387259 | 3/1975 | United Kingdom | 267/136 |

Primary Examiner—Matthew C. Graham

[57] ABSTRACT

A mounting arrangement that is particularly well-suited for use in environments wherein extremely high loads are encountered. Particularly, a motor mount for use with water craft is disclosed. The mounting arrangement comprises a base plate, and a resilient member is affixed to the base plate. The resilient member is generally comprised of a rubber-like compound, or the like, that provides for dampening of vibration. The resilient member is generally bonded to the base plate, and preferably, a vulcanization process is employed to secure the two components. A disk-like member, or insert, is secured in the resilient member. The insert has a cove disposed around the periphery of the edge thereof and into which the resilient member is disposed that provides a mechanical linkage therebetween. The insert is also preferable bonded to the resilient member by means of the vulcanization process at the same time as the base plate. The cove provides greater bonding area between the insert and the resilient member, and the mechanical linkage created by the portion of the resilient member that captivates the lower portion of the insert provides for an extremely strong arrangement that will generally not deteriorate or disengage when large forces are encountered. The insert has a top portion typically has a shape with at least one flat edge, or other noncircular cross section, that is adapted to prevent rotation thereof relative to the resilient member. The bottom portion of the insert has edges that have a relatively smooth contour to prevent the creation of fractures in the resilient member. In addition, the base plate and insert are generally comprised of stainless steel. This minimizes any corrosion caused by the use of steel bolts employed to secure the water craft, for example, to the mounting arrangement.

13 Claims, 1 Drawing Sheet

VIBRATION DAMPENING MOTOR MOUNT

BACKGROUND

The present invention relates generally to vibration dampening motor mounts, and more particularly to a motor mount for use in water craft, such as jets skis, and the like, that incorporates a mechanical linkage feature that improves the mechanical integrity of the mount.

Conventional jet ski motor mounts generally have an aluminum base onto which is molded a rubber dampening member that is designed to dampen shocks received by the motor and the hull of the ski during operation in the water. Typically, an aluminum disk having a threaded hole therein for securing the motor is bonded into the of the dampening member. The motor is usually secured to the mount by means of a steel or stainless steel bolt.

During operation, and particularly when the jet ski is ridden in salt water, over time, the aluminum disk gets corroded at the interface between it and the rubber dampening member. Eventually, the bonding area deteriorates and the mount breaks in a manner such that the mounting disk pulls out of the dampening member. In addition, since dissimilar metals are generally employed, namely the aluminum disk and the steel bolt, further corrosion occurs due to this.

Furthermore, the mounting disk is generally has a round shape, and the vigorous forces encountered due to the vibration of a relatively large displacement motor and the pounding resulting from impacts received in jumping waves, and the like, cause enormous forces to be exerted on the motor mount. These enormous forces must be restrained by the motor mount. However, in conventional designs incorporating rating the circular disk member, once corrosion has eroded the bonding between the disk and the dampening member, typically the disk is torn from its seat in the dampening member and the mount is destroyed.

Accordingly, it would be desirable to have a more reliable mounting arrangement, and in particular, a motor mount for use in water craft that can withstand the extreme forces exerted on it without breaking during normal peration.

SUMMARY OF THE INVENTION

In order to overcome the limitations cited above with respect to conventional mounting arrangement, the present invention provides for an improved vibration dampening mounting arrangement that is particularly well-suited for use in water craft and the like. The mounting arrangement is specifically designed for use with water craft, such as jet skis, and other machines that encounter extremely high loads exerted in a variety of direction on the machine. The mounting arrangement comprises a base plate that is generally made of stainless steel, and that has a central opening therein. Additional openings may be provided for securing the arrangement to a mounting surface, such as the wall of the jet ski, for example. Furthermore, the base plate may have a plurality of additional openings therein adapted to permit attachment of the mounting arrangement to the machine.

A resilient member is affixed to the base plate and has an opening extending therethrough that is substantially aligned with the opening in the base plate. The resilient member is generally comprised of a rubber-like compound, or the like, that provides for dampening of vibration. The resilient member is generally bonded to the base plate, and preferably, a vulcanization process is employed to secure the two components.

A disk-like member, or insert, is secured in the resilient member and has an opening therein that is substantially aligned with the opening in the resilient member. This opening is adapted to securably engage an object to be held by the mounting arrangement. In particular, this opening may be a threaded hole through which a securing bolt is engaged to hold a motor of a jet ski, for example. The insert has a cove disposed around the periphery of the edge thereof and into which the resilient member is disposed. This cove provides a mechanical linkage between the insert and the resilient member. The insert is also preferable bonded to the resilient member by means of the vulcanization process at the same time as the base plate. The cove provides greater bonding area between the insert and the resilient member, and the mechanical linkage created by the portion of the resilient member that captivates the lower portion of the insert provides for an extremely strong arrangement that will generally not deteriorate or disengage when large forces are encountered.

In order to provide for further integrity, the base plate may have at least one additional opening therein into which a portion of the resilient member is disposed. This additional mechanical linkage between the resilient member and the base plate provides a means to resist or prevent relative rotation therebetween during torsional loads.

The insert has a top portion typically has a shape with at least one flat edge, or other noncircular cross section, that is adapted to prevent rotation of the insert relative to the resilient member. The bottom portion of the insert has edges that have a relatively smooth contour to prevent the creation of fractures in the resilient member.

The base plate and insert are generally comprised of stainless steel. This minimizes any corrosion caused by the use of steel bolts employed to secure a motor or other machine to the mounting arrangement. The smooth edges of the bottom surface of the insert minimize or prevent the formation of cracks in the resilient member caused by twisting thereof.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Although the present invention provides a general mounting arrangement for use in providing vibration dampening and mounting of machinery, it will be described with reference to its use in a water craft wherein it is employed to secure a motor to a hull of a water craft, such as a jet ski, for example. In particular, the forces exerted on the mounting arrangement when empleyed in a jet ski operating environment are enormous, and the present invention was specifically designed to provide a reliable means to secure motors in such severs environments.

Figure 1:
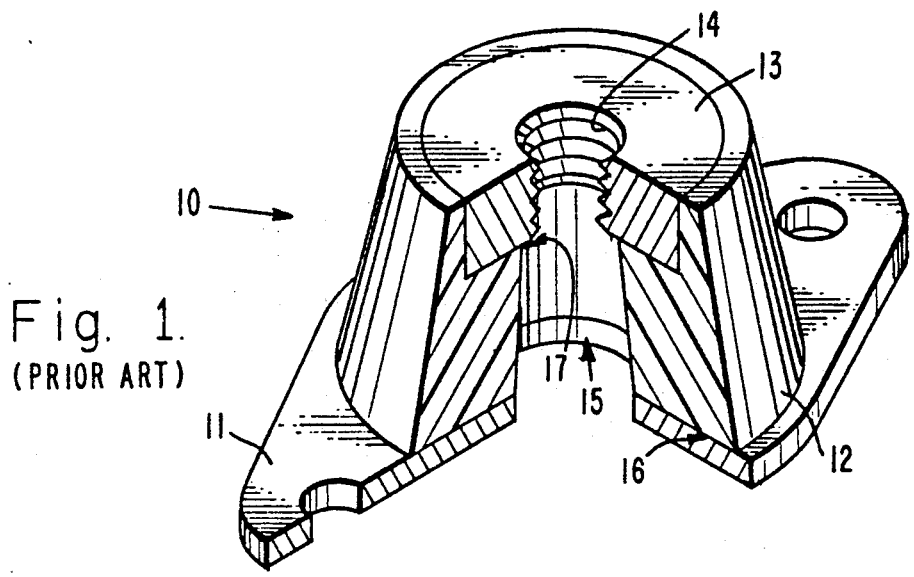
FIG. 1 illustrates a conventional mounting arrangement.

Referring to FIG. 1, it illustrates a conventional motor mount 10 that is typically employed in mounting motors to the hulls of a jet ski, for example. The motor mount 10 is comprised of a base plate 11 that has an opening therein and that is generally comprised of aluminum, for example. A resilient member 12, which is generally comprised of rubber, for example, is bonded to the base plate 11. The top portion of the resilient member 12 has a circular cut-out into which an insert 13 having a theaded hole 14 disposed therein is bonded. An opening 15 is disposed in the resilient member 12 that is in alignment with the opening in the base plate 11 and the theaded hole 14 in the insert 13. The insert 13 has a circular cross section and is comprised of aluminum.

Typically, the base plate 11 and disk 13 of the conventional mount 10 are made of aluminum and are bonded to a molded rubber resilient member 12 by means of epoxy or a vulcanization process. The disadvantages of this conventional mount include the use of aluminum which will oxidize and corrode in the presence of salt water, for example. This corrosion helps to deteriorate the bond between the rubber resilient member 12 and the aluminum insert 13 and has plate 11 at their respective bonding interfaces. Eventually the mount 10 fatigues and the insert 13 pulls out of the resilient member 12.

Typically the motor is secured to the mount with a steel or stainless steel bolt that is threaded into the threaded hole 14. The dissimilar metals causes corrosion between the parts that helps to deteriorate the holding capacity of the mount 10. In addition the fact that the disk 13 is circular, it can rotate relative to the resilient member 12 when strong forces are encountered. Typically, a jet ski has a 50 horsepower motor, for example, which vibrates a substantial amount. These vibrations weaken the bond between the disk 13 and the resilient member 12. The pounding of the jet ski on the surface of the water exerts enormous forces on the mount 10 and these forces are exerted in all directions. Consequently, enormous torsional forces are exerted on the interface between the disk 13 and the resilient member 12. Consequently, the disk 13 eventually is torn away from the resilient member 12 and the mount 10 is ruined.

Figure 2:
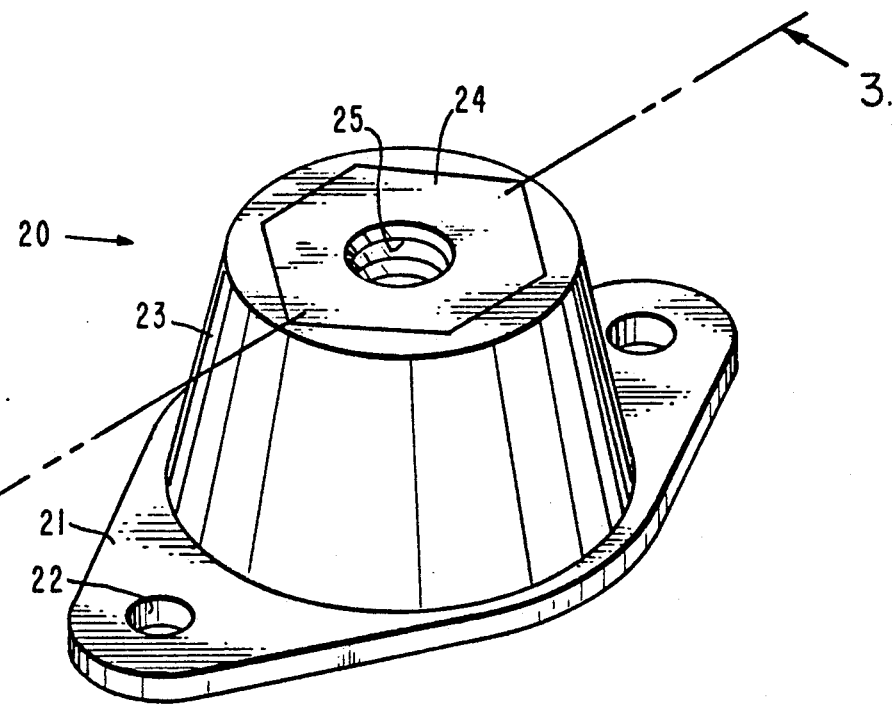
FIG. 2 is a mounting arrangement in accordance with the principles of the present invention.

Referring to FIG. 2, a mounting arrangement 20 in accordance with the principles of the present invention is shown. The mounting arrangement 20 comprises a base plate 21 which may have a plurality of mounting holes 22 disposed therein. A resilient member 23 is bonded to the base plate 21 by means of a vulcanization or compression bonding procedure, for example. A disk-like member, or insert 24, having a threaded opening 25 disposed therein is disposed in the resilient member 23. The insert 24 has its exposed surface generally flush with the top of the resilient member 23, and it has a noncircular cross section, having at least one flat surface. The design shown in FIG. 2 comprises a hexagonal shaped insert 23, but the present invention is not limited to the use of this preferred shape.

Figure 3:
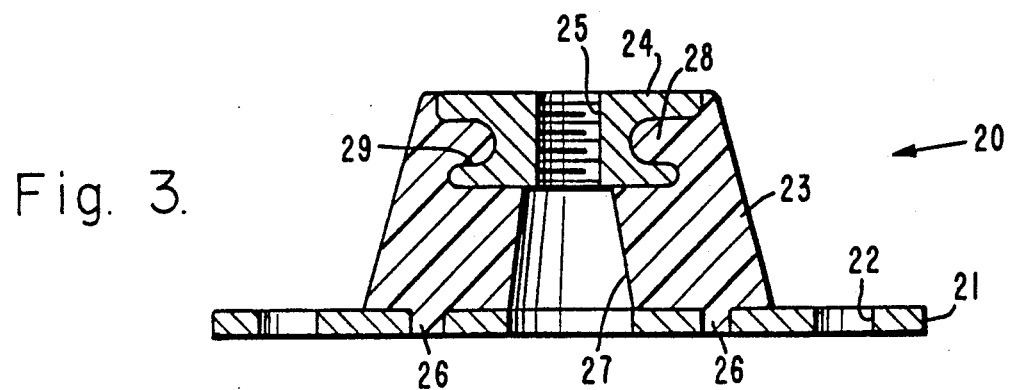
FIG. 3 is a cross sectional view of the mounting arrangement of FIG. 2 taken along the line 3-3.

Referring to FIG. 3, a cross sectional view of the mounting arrangement 20 of FIG. 2 taken along the line 3-3 is shown. The base plate 21 is shown having holes therein into which protrude a portion of the resilient member 26. This is provided as a means to resist rotational forces the would operate to tear the resilient member 23 from the base plate 21. The insert 24 is also shown in more detail. The insert has an H-shaped cross section, and the bottom portion thereof has a circular shape, in contrast to the hexagonal shape of the top portion thereof. The bottom portion also has a smoothly contoured surface 29 that is adapted to prevent the formation of cracks in the resilient member once it hardens or deteriorates. Also, an quite importantly, the insert 24 has a cove or groove machined in the edge thereof that extends substantially around the periphery thereof. The resilient member 23 has a portion 28 thereof that protrudes into the cove of the insert. This provides an additional bonding surface for the two components and also provides a mechanical linkage between them. This substantially prevents the removal of the insert from the resilient member 23 when severe forces are exerted on the mounting arrangement 20.

The present invention provides for vibration dampening at the mounting point between a motor and a fiberglass hull of a water craft, for example, although the design has use with any object that requires vibration isolation, and especially in severe environments. The mechanical linkage provided by the portion of the resilient member 23 that extends into the cove of the insert 24 provides for a strong interface between the two components that minimizes the possibility of the insert 24 twisting out of the resilient member 23. In addition, the use of stainless steel materials for the insert 24 and the base plate 21 minimizes the corrosion due to the use of dissimilar metals in the conventional mount.

The insert 24 is generally thicker than the conventional mount, and is made of stainless steel which provides a better bonding surface than aluminum. The hexshaped upper portion of the insert 24 resists twisting in the resilient member 23. The forces are vigorous and abrupt in all directions the use of the mechanical linkage of the present invention is required for the mounting arrangement to withstand these tremendous forces.

The cove is a 360 degree groove machined into the outer perimeter of the insert 24 which provides a 90 degree shelf once it is bonded into the resilient member 23 that increases the bonding area and provides a mechanical interface to securely hold the insert 24 within the resilient member 23. The lower lip of the insert 24 is completely embedded in the resilient member 23 and will not pull out when severe forces are encountered.

The three components of the mounting arrangement 20 are bonded in a 1500 pounds per square inch high compression mold which vulcanizes the components together. The metal surfaces are treated with a sulfur material that forms a film on the bonding surface, and this film reacts with the heat during the molding process to chemically bond the resilient member 23 to the metal components.

The bottom of the insert 24 is generally machined to form a hex-shaped piece like the top portion. However, the lower hex-shaped portion is machined to form the smooth surfaces that minimize the possibility that this portion of the insert 24 will not create a crack that could fatigue the resilient member 23.

Thus, there has been described a new and improved mounting arrangement, and in particular improved motor mount for use in water craft, and the like, that is designed to withstand the extreme forces exerted on it during normal use. It is to be understood that the above-described embodiment is merely illustrative of some of the many specific embodiments which represent applications of the principles of the present invention.

Clearly, numerous and other arrangements can be readily devised by those skilled in the art without departing from the scope of the invention.

What is claimed is:

1. A mounting arrangement comprising:
    a base plate having an opening;
    a resilient member affixed to the base plate and having an opening extending therethrough that is substantially aligned with the opening in the base plate;
    a disk-like member secured in the resilient member and having an opening therein that is substantially aligned with the opening in the resilient member for securably engaging an object to be held by the mounting arrangement, and having a peripheral edge containing a continuous, smoothly contoured, concave groove into which the resilient member is disposed, which groove provides a mechanical linkage between the disk-like member and the resilient member.

2. The mounting arrangement claim 1 wherein the base plate has a plurality of additional openings therein adapted to permit attachment of the mounting arrangement.

3. The mounting arrangement of claim 2 wherein the base plate has at least one additional opening therein into which a portion of the resilient member is disposed that resist rotation of the resilient member relative to the base plate during torsional loads.

4. The mounting arrangement of claim 1 wherein the disk-like member has an upper portion having a shape with at least one flat edge to prevent rotation thereof relative to the resilient member.

5. The mounting arrangement of claim 4 wherein the disk-like member has a bottom portion whose edges have a relatively smooth contour to prevent the creation of fractures in the resilient member.

6. The mounting arrangement of claim 1 wherein an upper portion of the disk-like member has a noncircular cross section that inhibits rotation thereof relative to the resilient member.

7. The mounting arrangement of claim 1 wherein the base plate and disk-like member are comprised of stainless steel.

8. A mounting arrangement comprising:
    a stainless steel base plate having an opening;
    a resilient member affixed to the base plate and having an opening extending therethrough that is substantially aligned with the opening in the base plate;
    a stainless steel disk-like member secured in the resilient member and having an opening therein that is substantially aligned with the opening in the resilient member for securably engaging an object to be held by the mounting arrangement, and having a peripheral edge containing a continous, smoothly contoured, concave groove into which the resilient member is disposed, which groove provides a mechanical linkage between the disk-like member and the resilient member, and having an upper portion having a noncircular cross section that inhibits rotation thereof relative to the resilient member and a lower portion whose edges have a relatively smooth contour.

9. The mounting arrangement of claim 8 wherein the base plate has a plurality of additional openings therein adapted to permit attachment of the mounting arrangement.

10. The mounting arrangement of claim 9 wherein the base plate has at least one additional opening therein into which a portion of the resilient member is disposed that resist rotation of the resilient member relative to the base plate during torsional loads.

11. A mounting arrangement comprising:
    a base plate having an opening and having a plurality of holes disposed therein adapted to permit attachment of the mounting arrangement;
    a resilient member affixed to the base plate and having an opening extending therethrough substantially aligned with the opening in the base plate, the resilient member having portions that protrude into a plurality of holes in the base plate provided to resist rotation of the resilient member relative to the base plate during torsional loads;
    an insert affixed to the resilient member and having a threaded opening disposed therein substantially aligned with the opening in the resilient member for securably engaging an object to be held by the mounting arrangement, the insert having an exposed surface generally flush with the top of the resilient member, the insert having an H-shaped cross section, the top portion thereof having a noncircular geometric shape having at least one flat surface to inhibit rotation thereof relative to the resilient member, and the bottom portion thereof having a substantially circular shape and having a smoothly contoured surface adapted to prevent the formation of cracks in the resilient member, the center portion thereof having a cove shape extending substantially around the periphery of the insert that is adapted to provide a mechanical linkage between the insert and the resilient member.

12. The mounting arrangement of claim 11 wherein the base plate has at least two openings therein into which the portions of the resilient member are disposed that resist rotation of the resilient member relative to the base plate during torsional loads.

13. The mounting arrangement of claim 11 wherein the base plate and insert are comprised of stainless steel.

* * * * *